(12) United States Patent
Kim

(10) Patent No.: US 7,480,314 B2
(45) Date of Patent: Jan. 20, 2009

(54) METHOD FOR PROVIDING MULTIMEDIA DATA VIA COMMUNICATION NETWORK

(75) Inventor: Jae Min Kim, Seoul (KR)

(73) Assignee: Realnetworks Asia Pacific Co., Ltd., Seoul (KR)

( * ) Notice: Subject to any disclaimer, the term of this patent is extended or adjusted under 35 U.S.C. 154(b) by 720 days.

(21) Appl. No.: 11/190,800

(22) Filed: Jul. 27, 2005

(65) Prior Publication Data
US 2006/0023752 A1    Feb. 2, 2006

(30) Foreign Application Priority Data
Jul. 29, 2004    (KR) ............... 10-2004-0059656

(51) Int. Cl.
*H04H 20/28*    (2008.01)
(52) U.S. Cl. .................... 370/487; 370/498
(58) Field of Classification Search ............ 370/487, 370/468, 486, 352, 422, 252, 538, 539, 420, 370/540, 356, 518, 519, 508, 509, 498, 510; 709/227, 228
See application file for complete search history.

(56) References Cited

U.S. PATENT DOCUMENTS 7,082,106 B2 * 7/2006 Sharma et al. .............. 370/276
7,151,782 B1 * 12/2006 Oz et al. ..................... 370/468
7,412,727 B2 * 8/2008 Kim et al. ..................... 726/29
2003/0014367 A1    1/2003 Tubinis

FOREIGN PATENT DOCUMENTS

| KR | 1020010057611 | | 9/2001 |
| KR | 1020020003282 | | 1/2002 |
| KR | 1020020042848 | | 6/2002 |
| KR | 102003 0012764 | * | 2/2003 |
| WO | WO03/062953 | | 7/2003 |

* cited by examiner

*Primary Examiner*—Chi H Pham
*Assistant Examiner*—Alexander Boakye
(74) *Attorney, Agent, or Firm*—Ladas & Parry LLP

(57) ABSTRACT

The present invention relates to a method for providing multimedia data, and more particularly, to a method for providing multimedia data in which a predetermined fee is received from a user who wants multimedia data, and in this case, the user is enabled to download the multimedia data unrestrictedly for a predetermined period corresponding to the fee and play the downloaded multimedia data in various media of the user. According to the present invention, there is provided a method for providing multimedia data, enabling a user who pays a flat fee to download and play multimedia data unrestrictedly for a certain period, thereby reducing a user burden for download of multimedia data.

11 Claims, 6 Drawing Sheets

FIG. 3

<USER DB>

| USER ID | AVAILABLE PERIOD INFORMATION |
|---|---|
| muhann1005 | By July 31, 2004 |
| victory02 | By June 12, 2004 |
| ssong506 | By January 1, 2005 |
| yoyo12100 | By April 5, 2004 |
| bborry007 | September 12, 2004 |
| ⋮ | |

<DB USER TERMINAL AUTHENTICATION NO. DB>

| USER ID | FIRST TERMINAL (PC) | SECOND TERMINAL (MP3 PLAYER) |
|---|---|---|
| muhann1005 | 'A' | 'A1' |
| victory02 | 'B' | 'B2' |
| ssong506 | 'C' | 'C3' |
| yoyo12100 | 'D' | 'D4' |
| bborry007 | 'E' | 'E5' |
| ⋮ | | |

METHOD FOR PROVIDING MULTIMEDIA DATA VIA COMMUNICATION NETWORK

This application claims the benefit of Korean Patent Application No. 2004-59656, filed on Jul. 29, 2004, in the Korean Intellectual Property Office, the disclosure of which is incorporated herein in its entirety by reference.

BACKGROUND OF THE INVENTION

1. Field of the Invention

The present invention relates to a method for providing multimedia data, and more particularly, to a method for providing multimedia data in which a predetermined fee is received from a user who wants multimedia data, and in this case, the user is enabled to download the multimedia data unrestrictedly for a predetermined period corresponding to the fee and play the downloaded multimedia data in various media of the user.

2. Description of the Related Art

Today, technology in relation to multimedia data has taken a great leap forward because of distribution of the Internet. The multimedia data represented in the type of music, moving pictures, images, and the like, gives rise to interests of users, provides various information to the users and records various information. Also, the multimedia data enables the users to indirectly have experience which is difficult to gain at firsthand. The multimedia data is already widely spread in our society and regarded as a kind of culture among people.

Generally, a method for providing multimedia data is classified into a streaming method and a download method.

In the streaming method, multimedia data provided from a predetermined server is played in real time. It is named as 'streaming' since transmitted data is processed just like streaming water. In order to operate the streaming, a client side receiving data has to be able to constantly transmit the data to an application program which collects data and transforms the collected data into a sound or a picture. If the client receives data high enough, extra data is streamed and played while being stored in a buffer. However, if the speed of receiving data is low, the play of data becomes unsmooth. In the meantime, even in case that multimedia data is played at the same time with transmission thereof by the streaming method, the method of downloading the multimedia data to a user terminal can be applied simultaneously. However, a method of enabling multimedia data not to be stored in a terminal of a user is mainly used in order to protect intellectual copy rights of the multimedia data.

At this time, a multimedia data providing service charges a user a fee based on a monthly flat fee system, and provides the user with multimedia data via the streaming method for a predetermined period. However, in case of using the streaming method, multimedia data is not stored in a user terminal, which is different from the download method. Thus, there is a problem that a user who wants to use multimedia data by a portable device, for example, an MP3 player which is unable to access a wired communication network like PC, or a wireless communication network like a cellular phone, cannot use the service. That is, environments where the user can be provided with multimedia data are restricted.

On the other hand, in the download method, multimedia data is downloaded to a user terminal, stored therein and played. At this time, the multimedia data providing service determines a fee per download of multimedia data and charges the determined fee to a user, whenever the multimedia data is provided to the user by the download method. For example, in case that multimedia data is music data, the user has to pay $0.5 for downloading the music data. However, in the method of enabling the user to pay money for respective music data per one download to the terminal, even in case of downloading the same music data, the user has to pay money each time. Also, the more the number of downloaded music data increases, the more money the user should pay. Thus, there is a problem that it is difficult for the user to download a plurality of music data and listen to them.

Also, in case that multimedia data is transmitted to a user terminal and stored therein by the download method, there is a concern that the user might copy the multimedia data and distribute the copied multimedia to another user. In this case, there is a problem that the right of a person who reserves intellectual property rights for multimedia data is infringed.

SUMMARY OF THE INVENTION

The present invention is conceived to solve the aforementioned problems in the prior art. Thus, it is an object of the present invention to provide a method for providing multimedia data in which a user who has paid a predetermined fee can download and play the multimedia data unrestrictedly for a predetermined available period and thus, a user burden can be reduced in comparison that the user is charged per every download of the multimedia data.

Also, it is another object of the present invention to provide a method for providing multimedia data in which the downloaded multimedia data is controlled to be playable for the available period only and thus, the multimedia data downloaded and stored in the user terminal cannot be used illegally after the available period passes.

Also, it is still another object of the present invention to provide a method for providing multimedia data in which the multimedia data can be played only in an authenticated portable device, such as for example, an MP3 player, by using a registered authentication number, for example, serial numbers granted to a user terminal, or a DRM tool of the user terminal in association with the user who has paid a fee and been approved, and thus, it is possible to prevent the multimedia data from illegally being provided to another user who is not allowed to play the multimedia data.

Also, it is yet another object of the present invention to provide a method for providing multimedia data in which an exact current time is controlled to be set up in a portable device, such as for example, an MP3 player which is not provided with a communication module for accessing a server directly through a wired/wireless communication network, and thus, it is possible to prevent a vicious attempt to constantly play the multimedia in a way of manipulating the time information of the portable device even after the available period passes.

Also, it is further another object of the present invention to provide a method for providing multimedia data in which a user can be free to use multimedia data using any one of a first through a third terminal when the user pays a fee, and the first terminal is connected to a server system for providing multimedia data through a wired communication network like a PC, the second terminal which is a mobile communication terminal is connected to the server system through a wireless communication network, and the third terminal is a portable device which is not connected to the server system through a wired/wireless communication network, however, can play the multimedia data. Namely, the present invention enables a user to be free to use multimedia data at any time and at any place with various playing devices.

In order to achieve the above objects and solve the problems in the prior art, according to an aspect of the present invention, there is provided a method for providing multimedia data at a multimedia data server, including the steps of: maintaining a multimedia database including multimedia data; maintaining a user database including available period information with respect to a right to download for each user, respectively, in which the right to download of the multimedia data is granted to the user for a period of time determined by the available period information; receiving a request for download of predetermined multimedia data from a user terminal through a wired/wireless communication network; determining whether the right to download has been granted to the user by referring to available period information associated with the user, included in the user database; searching the multimedia data by referring to the multimedia database, in case that the right to download has been granted to the user; generating authenticated multimedia data including the searched multimedia data and the available period information associated with the user, in which the available period information is information about a playable period for which the authenticated multimedia data can be played; and transmitting the authenticated multimedia data to the user terminal through the wired/wireless communication network, so as to control the multimedia data to be played in the user terminal for the playable period information by using available period information included in the authenticated multimedia data.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram illustrating configuration of a user terminal information database and a user database maintained on the side of a multimedia data server;

DETAILED DESCRIPTION OF THE INVENTION

Hereinafter, a method for providing multimedia data according to the present invention will be fully described with reference to the accompanying drawings.

Figure 1:
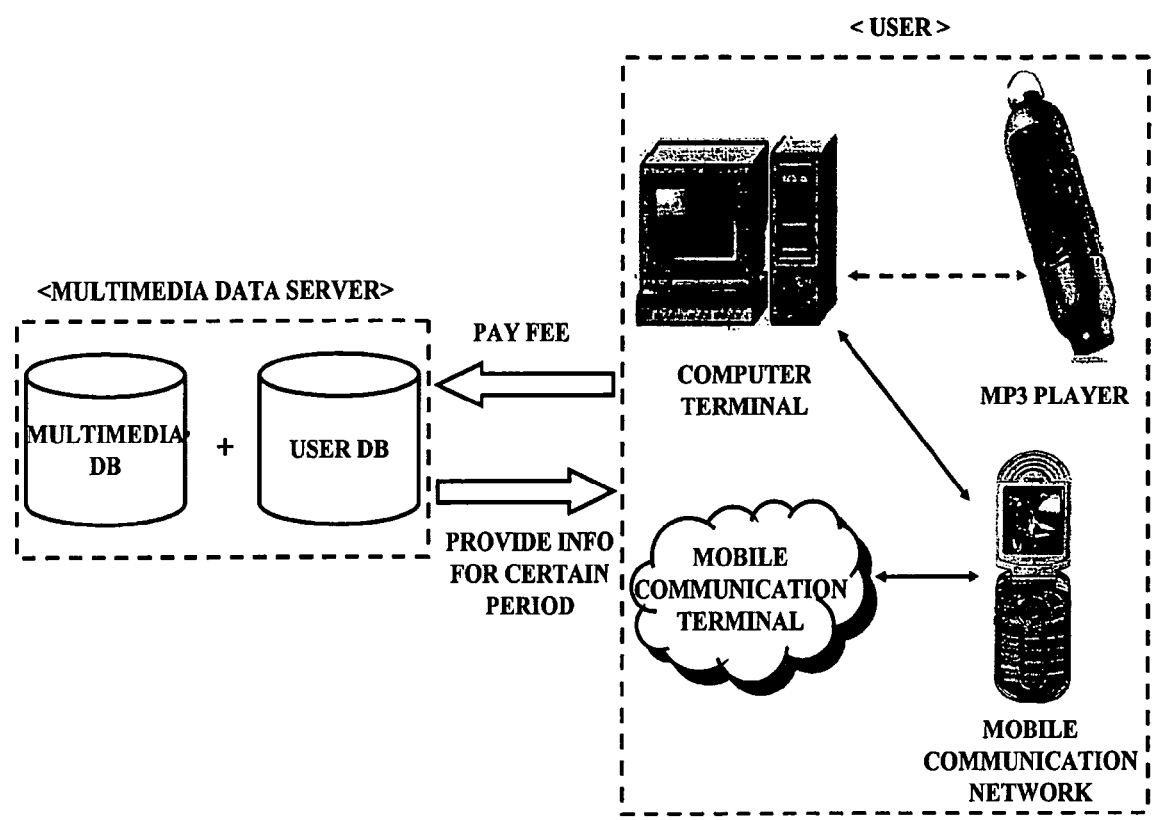
FIG. 1 is a diagram illustrating a network for embodying a method for providing multimedia data according to an exemplary embodiment of the present invention.

FIG. 1 is a diagram illustrating a network for embodying a method for providing multimedia data according to an exemplary embodiment of the present invention. The method for providing multimedia data according to the present embodiment can be performed by a predetermined system thereof. As illustrated in FIG. 1, a multimedia data server can provide multimedia data to a user.

When the user pays a predetermined fee, the multimedia data server provides multimedia data to a user terminal for a predetermined period, as per request of the user. The user terminal includes a terminal which is accessible to the multimedia data server through a wired/wireless communication network, such as a personal computer (PC), a cellular phone, a personal digital assistant (PDA), or the like. Also, the user terminal includes a portal device which can receive multimedia data downloaded to the user terminal again, such as for example, an MP3 player or the like.

In the meantime, the fee can be determined on the basis of the period for which the user can download multimedia data. For example, the multimedia data server can determine a fee of the multimedia data by periods, such as for example, 30,000 won for a month and 50,000 won for two months. Also, the fee can be decided by service provider's policy, more preferably in monthly rental fee type than in subscription fee type, in which the two types are monthly flat fee model. In case of the monthly rental type, the user pays a fee in the form of monthly rental with respect to the multimedia data and uses the same unrestrictedly for a rental period. Also, in case of the subscription fee type, the user can download multimedia data, irrespective of the kind thereof and the number thereof, while the user pays a subscription fee.

Hereinafter, a method for providing multimedia data according to an embodiment of the present invention will be further described with reference to FIG. 2.

Figure 2:
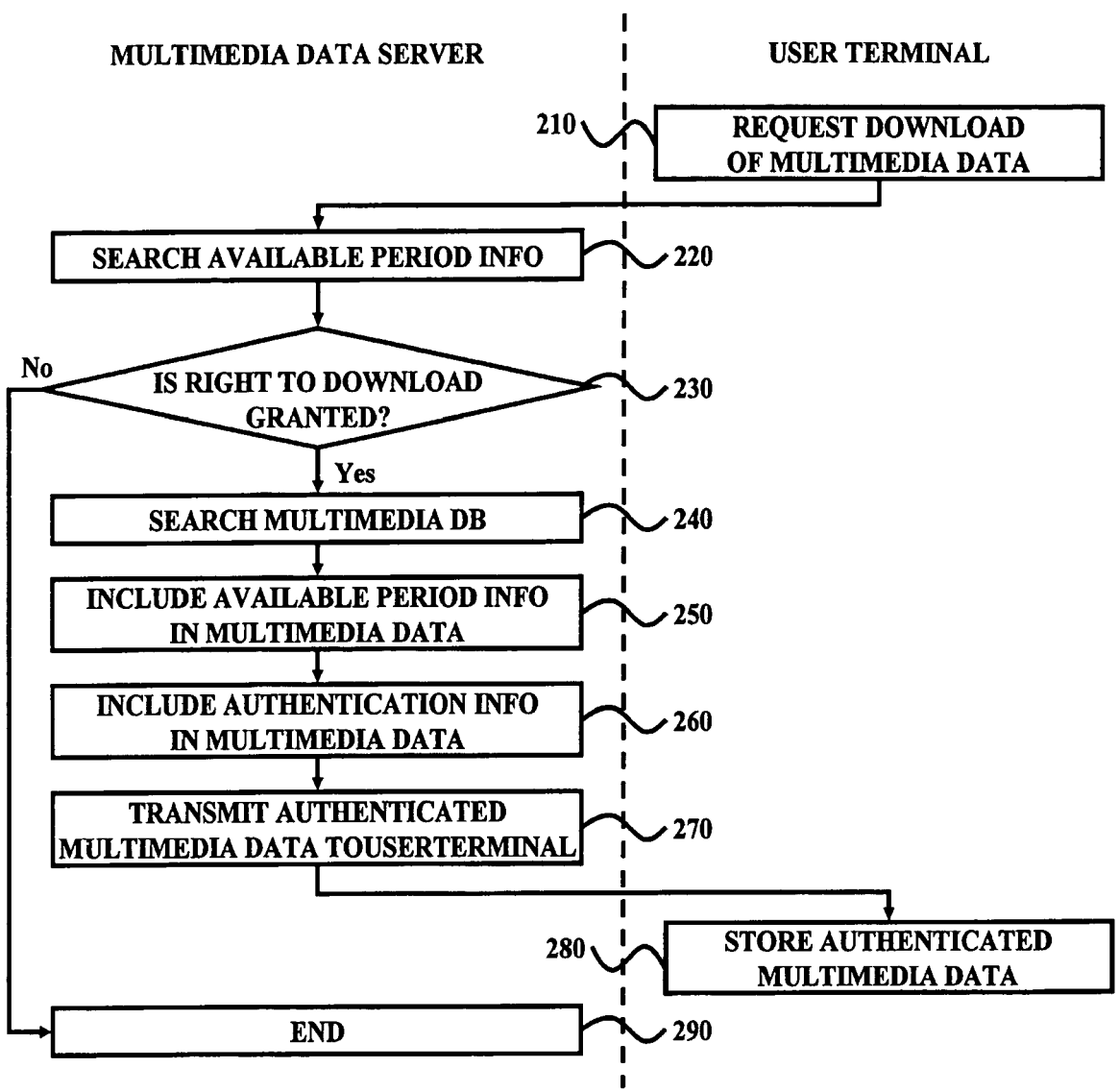
FIG. 2 is a flowchart illustrating procedures of transmitting multimedia data to a user terminal at a multimedia data server, in a method for providing multimedia data according to an exemplary embodiment of the present invention.

FIG. 2 is a flowchart illustrating procedures of transmitting multimedia data to a user terminal at a multimedia data server, in a method for providing multimedia data according to an exemplary embodiment of the present invention Referring to FIG. 2, in step 210, a user requests a multimedia data server of download of predetermined multimedia data.

In step 220, the multimedia data server searches available period information associated with the user by referring to a user database. FIG. 3 is a diagram illustrating configuration of a user terminal information database and a user database maintained on the side of a multimedia data server.

As illustrated in FIG. 3, the user database includes available period information with respect to a right to download for each user. At this time, a user ID is used as a user identifier to identify a user. However, the user identifier can be more variously adopted, such as a mobile communication terminal number of the user, and the like, which can identify the user.

In step 230, the multimedia data server determines whether the right to download of multimedia data is granted to the user who has requested the download in step 210 by using the searched available period information.

For example, in case that a user who requests download is "muhann1005", available period information allowing download of multimedia data and play thereof in association with the user "muhann1005" is "by Jul. 31, 2004". That is, referring to the available period information, the user "muhann1005" can download and play multimedia data by Jul. 31, 2004 unless the user pays an extra fee. Namely, the user "muhann1005" cannot download multimedia data since Jul. 31, 2004. Also, the downloaded multimedia data cannot be played. It will be described later.

When a user pays a predetermined fee and requests a right to download the multimedia data, a multimedia data server can generate information including a user identifier and predetermined available period information in association with the user and add the generated information to the user database, thereby updating the same.

In case that it is determined that the right to download is granted to the user by referring to the available period information, the multimedia data server searches a multimedia data requested from a user terminal by referring to the multimedia database. The multimedia database records multimedia data, such as MP3 files, moving picture images, image data, and the like. In order to provide the user with requested multimedia data, in case that the multimedia data is music data, the multimedia data server can provide the user with a user interface through which the user can search the music data by using a title of the music, a composer name thereof, a singer name thereof, a story thereof, and the like.

When multimedia data requested by the user is searched, the multimedia data server processes the searched multimedia data in order to transmit the same to the user, in step 250. That is, the multimedia data server includes available period information associated with the user in the searched multimedia data.

Also, according to another embodiment of the present invention, the multimedia data server includes predetermined authentication information in the searched multimedia data, in step 260. At this time, it may be a little different based on which authentication method is adopted between (1) an authentication method using a terminal authentication number (i.e., serial number of the terminal) and (2) one of the well-known DRM (Digital Rights Management) methods. In this specification, multimedia data including predetermined authentication information such configured is represented as "authenticated multimedia data."

First, in case of (1) the authentication method using a terminal authentication number, the authentication number is for identifying a user terminal of the user. For example, hardware number granted to the user terminal can be used. For this, an authentication number is stored in the user database for each user. When the user requests a multimedia data providing service, the multimedia data server can let the user register the authentication number of the user terminal of the user. Registration of the authentication number can be performed only once when the user uses a multimedia data providing service for the first time. The authentication number can be stored in the user terminal information database illustrated in a lower portion of FIG. 3. Only in case that the user plays multimedia data using a plurality of terminals, the authentication number of each terminal can be stored for each terminal.

Meanwhile, the authentication number may be stored in the user database in such a manner that the user inputs the authentication number directly. Also, the authentication number may be used in such a manner that the multimedia data server reads authentication information from a user terminal which is connected through a wired/wireless communication network and stores the read authentication information in the user database.

Also, in case of (2) the authentication method using DRM (Digital Rights Management), PKI (Public Key Infrastructure) can be used in which the multimedia data server encrypts the multimedia data by using a predetermined public key and transmits the encrypted multimedia data to a user terminal, and the user terminal decrypts the encrypted multimedia data by using a predetermined private key.

In step 270, the multimedia data server transmits authenticated multimedia data including the available period information and authentication information, to the user terminal.

In step 280, multimedia data transmitted from the multimedia data server is stored in a predetermined storage unit of the user terminal. A predetermined application program for supporting a multimedia data providing service according to the present invention may be installed in the user terminal. The application program may enable the multimedia data to be stored in a predetermined logical location of the storage unit, for example, a particular folder.

Also, the application program serves to receive time information from the multimedia data server and update a current time in the user terminal, in order to synchronize the current time of the user terminal with that of the multimedia data server. In the meantime, the application program may be provided with the time information from another server, besides the multimedia data server, for example, from a server providing time information specially.

The current time synchronized with the server is used as reference information to determine whether to play the authenticated multimedia data. Detailed description related thereto will be described later with reference to FIG. 4.

Authenticated multimedia data for each user can be played in various user terminals. Hereinafter, cases that authenticated multimedia data for each user is played in a user terminal connected to the multimedia data server through the wired Internet like a PC, a mobile communication terminal connected thereto through a wireless communication network, and an MP3 player that is unable to be connected thereto directly will be described respectively.

First, it will be described that the authenticated multimedia data is played in a user terminal, such as a PC and the like, with reference to FIG. 4. In case that a user pays a predetermined fee for each available period, the user can access the multimedia data server during the available period, download multimedia data from the multimedia data server, and store the downloaded multimedia data in his/her own user terminal.

In step 410, the user selects multimedia data and commands play of the selected multimedia data. Then, an application program installed in the user terminal searches a storage unit for the selected multimedia data. The storage unit of the user terminal stores "authenticated" multimedia data transmitted from the multimedia data server, as described in FIG. 2.

In step 420, the application program reads available period information included in the searched multimedia data. Also, the application program determines whether the play command is received within an available period which is determined by the available period information. The application programs confirms a current time by using synchronized time information as aforementioned, in order to determine whether the play command is received within the available period. The time information communicates with a predetermined server, such as the multimedia data server, and is compulsorily updated. Thus, it is possible to prevent the user from changing time information of a clock module of the user terminal into the available period information, thereby constantly playing the multimedia data even after the available period passes.

In case that the play command is not received within the available period of the selected multimedia data, the application program does not allow play thereof. Also, the application program may provide an additional process enabling the user to pay an additional fee and play the selected multimedia data.

In case that the play command is received within the available period of the searched multimedia data, the application program reads authentication information of the user terminal included in the searched multimedia data or compares the same with authentication information of the user terminal, in step 430. In this step 430, in case that an authentication method can be (1) the method using a terminal authentication number, the application program compares the authentication number included in the multimedia data with that of the user terminal. In case that the authentication number of the user terminal included in the searched multimedia data is identical to that of the user terminal, the application program determines that it is an authenticated user terminal and enables the multimedia data to be played in the user terminal. In case that the authentication number of the user terminal included in the searched multimedia data is not identical to that of the user terminal obtained from the user terminal, the application program determines that the searched multimedia data is abnormally stored in the user terminal of the user, and does not allow play of the searched multimedia data.

Also, in step 430, in case that an authentication method is (2) the method using DRM, the application program decrypts multimedia data encrypted with a predetermined public key, by using a private key existing in the user terminal. Thus, decryption with respect to the encrypted multimedia data cannot be performed in a user terminal, for example, a terminal of another user, not recording a private key corresponding to the private key. Thus, play of the multimedia data is not allowed.

In case that it is determined on the basis of available period information and authentication information included in the multimedia data that the play command is received within the set available period and the user terminal is an authenticated user terminal, the application program enables the multimedia data to be played by a program.

Hereinafter, it will be described that a user plays multimedia data by using his/her own mobile communication terminal. If within an available period, the user can access the multimedia data server through a wireless communication network, so as to receive authenticated multimedia data. Also, the user can receive authenticated multimedia data, which is downloaded to a PC via the wired Internet, to the mobile communication terminal by using a USB terminal or the like.

Figure 4:
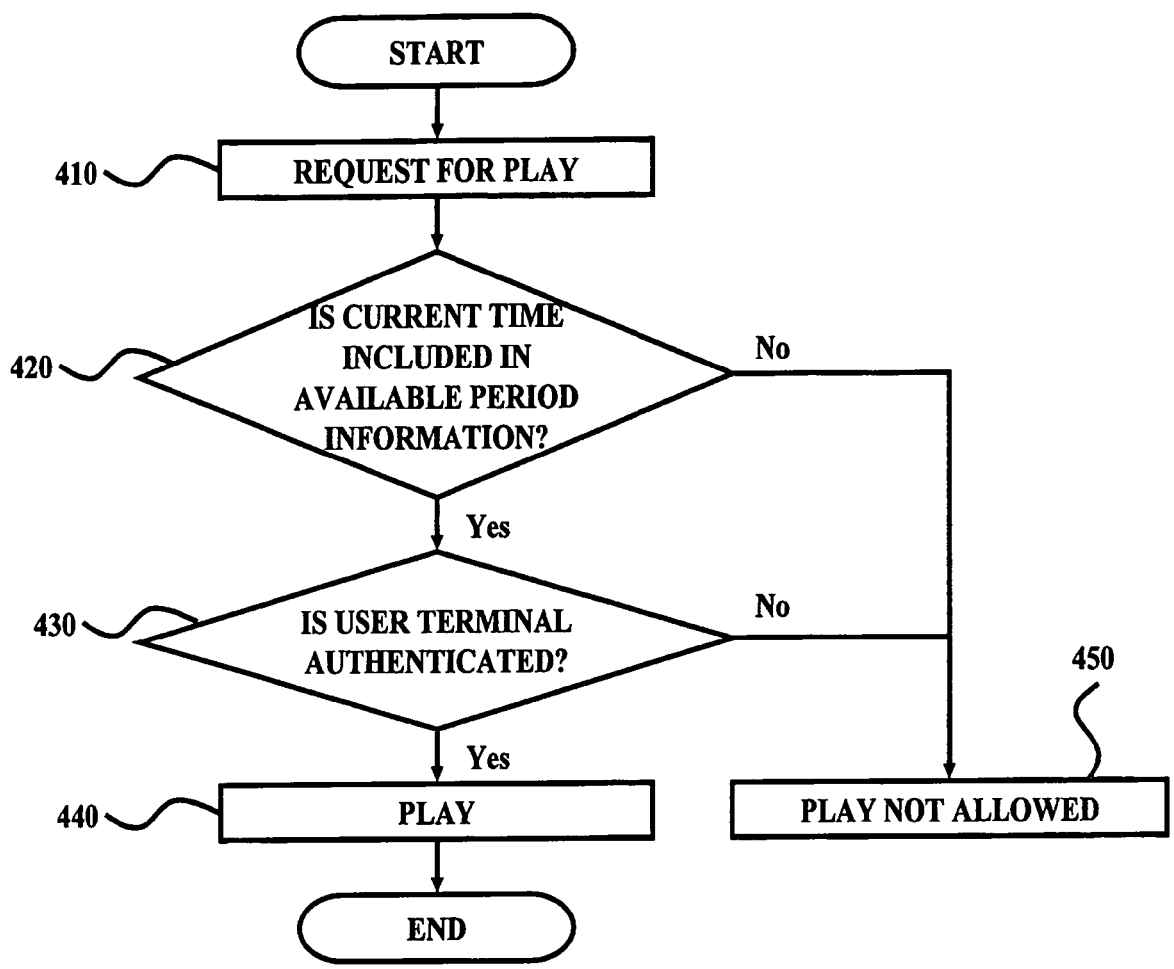
FIG. 4 is a flowchart illustrating procedures of generating a MP3 file stored in a user terminal on the basis of available period information, in a method for generating the MP3 file according to an exemplary embodiment of the present invention.

In case that the authenticated multimedia data is downloaded to the mobile communication terminal, procedures of playing the multimedia data will be as similar as in FIG. 4. That is, in case that the user inputs a play command with respect to predetermined multimedia data, the mobile communication terminal searches authenticated multimedia data recorded in a memory and extracts available period information included in the searched multimedia data. The mobile communication terminal determines whether the play command is received within the available period based on the available period information. Since the mobile communication terminal receives a current time in real time from a Base Station (BS), an exact current time can be grasped.

In case that it is determined that the play command is received within the available period, the mobile communication terminal plays the searched multimedia data to provide the same to the user. Thus, the user can be provided with multimedia data for a certain period.

Also, according to another embodiment of the present invention, the mobile communication terminal can play the multimedia data, only in case that the authentication information included in the searched multimedia data (a public key or an authentication number of a mobile communication terminal registered to a server) is identical to an authentication number granted to the mobile communication terminal (a private key or an authentication number of a mobile communication terminal). Hardware number, for example, ESN, granted to each mobile communication terminal can be used as the authentication number.

Hereinafter, it will be described that the user plays multimedia data by using his/her own portable device. For example, the portable device is an MP3 player.

Figure 5:
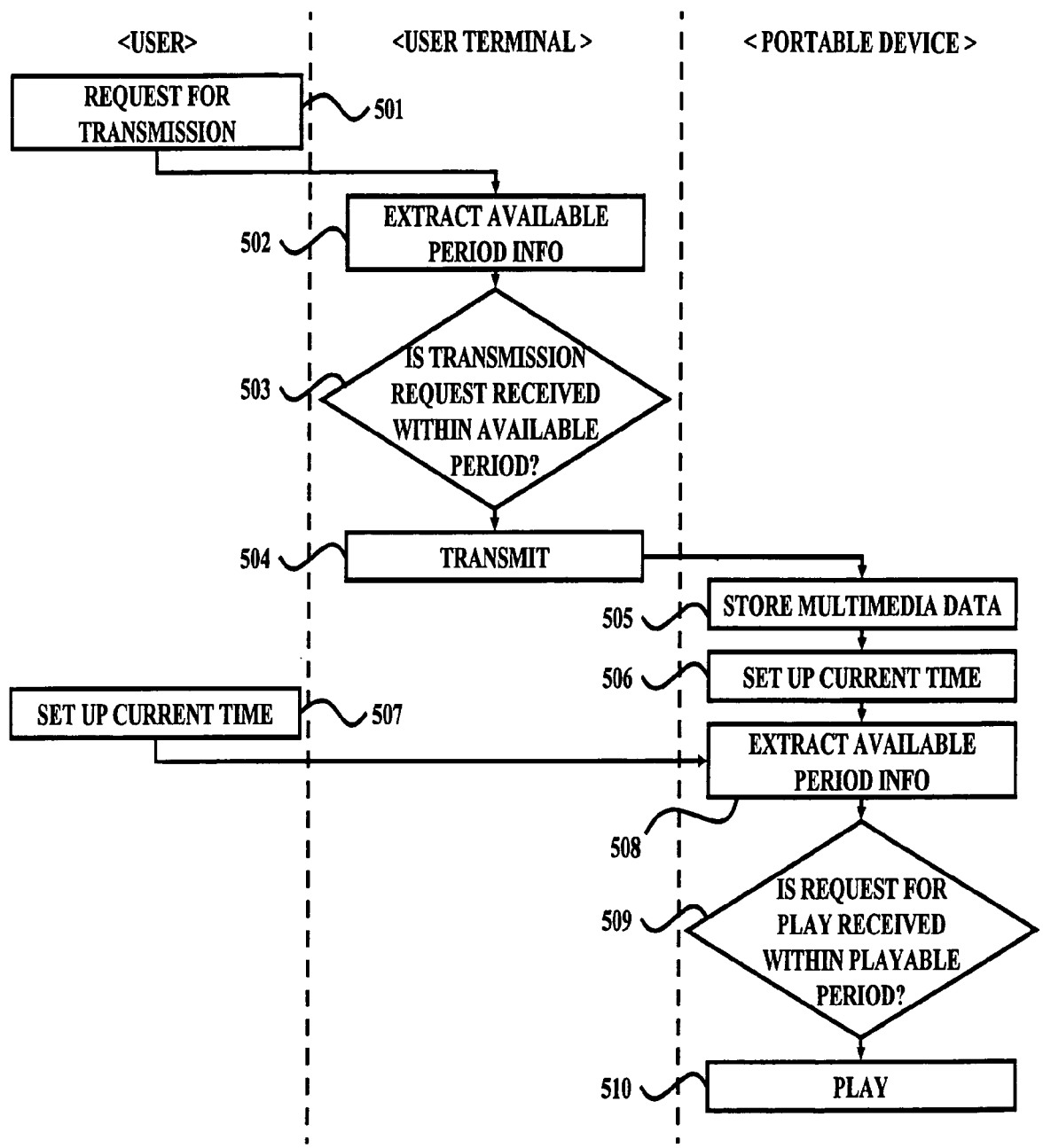
FIG. 5 is a diagram illustrating a configuration in which multimedia data is downloaded to a portable device and played therein.

The portable device according to the present embodiment is not provided with a communication module enabling direct communication with the multimedia data server. Thus, the portable device can receive the multimedia data from a PC, by using a USB terminal, a UART terminal, an IR terminal, a wireless LAN, or Bluetooth. That is, the user can adopt a method of first downloading multimedia data to his/her own user terminal such as a PC, and later downloading the multimedia to a MP3 player again. Hereinafter, configuration of downloading multimedia data to the portable device to play the downloaded multimedia data will be further described with reference to FIG. 5.

In step 501, a user inputs a transmission request in the user terminal to transmit multimedia data to the portable device.

In step 502, an application program installed in the user terminal extracts available period information included in the multimedia data. As aforementioned, multimedia data stored in the user terminal is authenticated multimedia data including available period information or authentication information.

In step 503, the application program determines whether the transmission request is received within the available period based on the extracted available period information. For this, a current time is required. The current time can be determined by receiving time information from a predetermined server, as aforementioned.

In case that it is determined that the transmission request is received within the playable period, the application program enables the multimedia data to be transmitted to the portable device in step 504. In step 505, the portable device stores the transmitted multimedia data in a memory thereof.

Meanwhile, in case that the portable device is connected to the user terminal through a USB terminal and the like, the application program controls a current time to be in a clock module of the portable device in accordance with the determined current time in step 506. Operations such above can be performed when the portable device is connected to the user terminal through a USB terminal or the like, or when the portable device is connected to the user terminal and a request for transmission of the multimedia data is received. Thus, a current time in the portable device which cannot make direct communication with the predetermined server can be exactly set up. Also, it is possible to prevent a vicious attempt to play the multimedia data even after the available period passes by manipulating the clock module in the portable device.

In step 507, the user inputs a request for play of the multimedia data into the portable device. Each step after the step 507 can be performed in case that the portable device is not connected to the user terminal, which is, in case that the user is moving carrying the portable device.

In case that the request for play is received, the portable device extracts available period information included in the multimedia data in step 508. In step 509, the portable device determines whether the request for play is received within the available period, which is the playable period, by using the available period information.

In case that it is determined that the request for play is received within the playable period, the portable device plays the multimedia data to provide the same to the user, in step 510.

Meanwhile, according to another embodiment of the present invention, the portable device may extract an authentication number included in the multimedia data, determines whether the extracted authentication number is identical to that granted to the portable device, and only in case that the extracted authentication number is identical to that granted to the portable device, play the multimedia data. That is, the portable device according to the present embodiment plays the multimedia data only in case that the play command is received within the playable period and the two authentication numbers are identical to each other.

Also, as described above, in case that an authentication method of the portable device is one using DRM, multimedia data which is encrypted at the multimedia data server with a predetermined public key can be decrypted by using a private key recorded in the portable device. It can be determined whether to play corresponding multimedia data in accordance with playable period information included in the decrypted multimedia data. In this case, the portable device plays the multimedia data only in case that the play command is received within the playable period and the portable device has a private key for decrypting the encrypted multimedia data.

Figure 6:
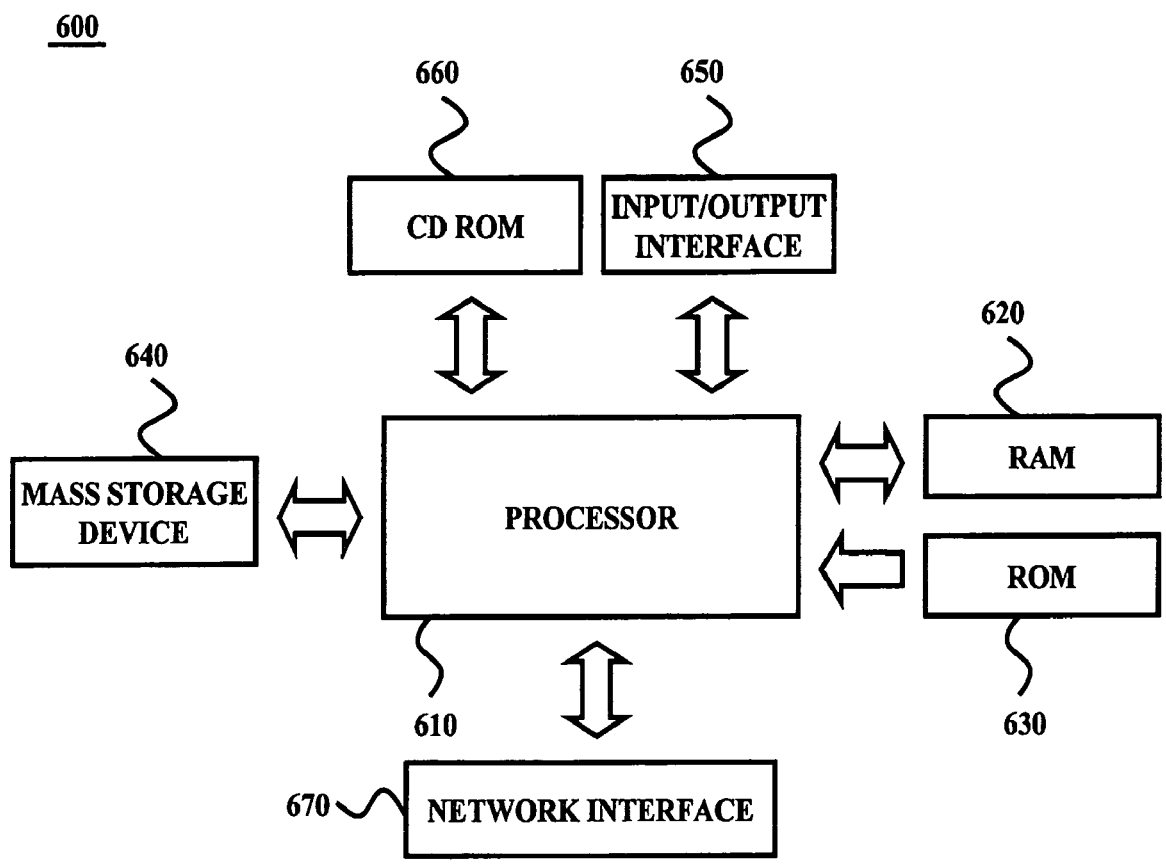
FIG. 6 is an internal block diagram of a general-purpose computer which can be employed in implementing a multimedia data providing method according to the present invention.

FIG. 6 is an internal block diagram of a general-purpose computer which can be employed in implementing a multimedia data providing method according to the present invention.

A computer apparatus 600 includes at least one processor 610 connected to a main memory device including a RAM (Random Access Memory) 620 and a ROM (Read Only Memory) 630. The processor 610 is also called as a central processing unit CPU. As well-known to the field of the art, the ROM 630 uni-directionally transmits data and instructions to the CPU, and the RAM 620 is generally used for bi-directionally transmitting data and instructions. The RAM 620 and the ROM 630 may include a certain proper form of a computer readable recording medium. A mass storage device 640 is bi-directionally connected to the processor 610 to provide additional data storage capacity and may be one of the computer readable recording medium. The mass storage device 640 is used for storing programs and data and is an auxiliary memory. A particular mass storage device such as a CD ROM 660 may be used. The processor 610 is connected to at least one input/output interface 650 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 610 may be connected to a wired or wireless communication network via a network interface 670. The procedure of the described method can be performed via the network connection. The described devices and tools are well-known to those skilled in the art of computer hardware and software.

The hardware elements above may be configured to act as one or more software modules for implementing the operations of this invention.

According to the present invention, there is provided a method for providing multimedia data in which a user who has paid a certain fee can download and play multimedia data unrestrictedly for a certain available period and thus, a user burden can be reduced in comparison that the user is charged per every download of multimedia data.

Also, according to the present invention, there is provided a method for providing multimedia data in which the downloaded multimedia data is controlled to be playable for the available period only and thus, the multimedia data downloaded and stored in the user terminal cannot be used illegally after the available period passes.

Also, according to the present invention, there is provided a method for providing multimedia data in which the multimedia data is enabled to be played only in an authenticated portable device, such as for example, an MP3 player, by using a registered authentication number, for example, hardware number granted to a user terminal, or a DRM tool of the user terminal in association with the user who has paid a fee and been approved, and thus, it is possible to prevent the multimedia data from illegally being provided to another user who is not allowed to play the multimedia data.

Also, according to the present invention, there is provided a method for providing multimedia data in which an exact current time is controlled to be set up in a portable device, such as for example, an MP3 player which is not provided with a communication module directly accessing a server through a wired/wireless communication network, and thus, it is possible to prevent a vicious attempt to constantly play the multimedia in a way of manipulating the time information of the portable device even after the available period passes.

Also, according to the present invention, there is provided a method for providing multimedia data in which a user can be free to use multimedia data using any one of first to third terminals when the user pays a fee, and the first terminal is connected to a server system performing a multimedia data providing service through a wired communication network like a PC, the second terminal which is a mobile communication terminal is connected to the server system through a wireless communication network, and the terminal is a portable device which is not connected to a multimedia data server through a wired/wireless communication network, however, can play multimedia data. Namely, the present invention enables a user to be free to use multimedia data at any time and at any place using various play devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing multimedia data at a multimedia data server, the method comprising the steps of:
maintaining a multimedia database including multimedia data;
maintaining a user database including available period information with respect to a right to download for each user, respectively, in which the right to download of the multimedia data is granted to the user for a period of time determined by the available period information;
receiving a request for download of predetermined multimedia data from a user terminal through a wired/wireless communication network;
determining whether the right to download has been granted to the user by referring to available period information associated with the user, included in the user database;
searching the multimedia data by referring to the multimedia database, in case that the right to download has been granted to the user;
generating authenticated multimedia data including the searched multimedia data and the available period information associated with the user, in which the available period information is information about a playable period for which the authenticated multimedia data can be played; and
transmitting the authenticated multimedia data to the user terminal through the wired/wireless communication network, so as to control the multimedia data to be played in the user terminal for the playable period information by using available period information included in the authenticated multimedia data.

2. The method of claim 1, wherein in case that the user terminal accesses the multimedia data server via the Internet, the user terminal performs the steps of:

receiving the authenticated multimedia data from the multimedia data server, so as to store the same in a storage unit of the user terminal;

receiving time information from a predetermined time server repeatedly, so as to determine a current time;

receiving a request for transmission of the authenticated multimedia data stored in the storage unit to a portable device of the user, from the user;

transmitting the authenticated multimedia data to the portable device; and controlling the portable device, such that a current time be determined in a clock module thereof in accordance with the determined current time; and the portable device performs the steps of:

in case that a request for playing of the authenticated multimedia data is received from the user, determining whether the request for playing is received within the playable period by using the current time determined in the clock module; and playing the authenticated multimedia data to provide the same to the user, in case that the request for playing is received within the playable period.

3. The method of claim 2, wherein the step of transmitting the authenticated multimedia data to the portable device comprises the steps of:

determining whether the request for transmission is received within the playable period, which is determined by the available period information included in the authenticated multimedia data, by using the determined current time; and transmitting the authenticated multimedia data to the portable device in case that it is determined that the request for transmission is received within the playable period.

4. The method of claim 2, wherein the user terminal further performs the steps of:

receiving a play command of authenticated multimedia data stored in the storage unit, from the user;

determining whether the play command is received within the playable period, which is determined by available period information included in the authenticated multimedia data, by using the determined current time; and playing the authenticated multimedia data to provide the same to the user, in case that it is determined that the play command is received within the playable period.

5. The method of claim 2, wherein:

the user database further includes an authentication number of the portable device associated with the user;

the step of generating the authenticated multimedia data at the multimedia data server is the step of generating authenticated multimedia data including the searched multimedia data, available period information associated with the user, and an authentication number of a portable device associated with the user; and the step of playing the authenticated multimedia data at the portable device to provide the same to the user is the step of generating the authenticated multimedia data in case that an authentication number included therein is identical to that stored in the portable device.

6. The method of claim 2, wherein:

the user database further includes a public key corresponding to a private key recorded in the portable device associated with the user;

the step of generating the authenticated multimedia data at the multimedia data server is the step of encrypting multimedia data including the searched multimedia data and available period information associated with the user, with the public key, so as to generate the authenticated multimedia data; and the step of generating the authenticated multimedia data at the portable device to provide the same to the user is the step of decrypting the authenticated multimedia data with the private key of the portable device, so as to generate the authenticated multimedia data.

7. The method of claim 1, wherein the step of maintaining a user database including available period information with respect to a right to download for each user, respectively, comprises the steps of:

receiving a request for download service of multimedia data for a predetermined period, from a user;

controlling a service fee corresponding to the period to be charged to the user; and recording available period information about the period in the user database in association with the user, thereby granting a right to download of multimedia data for the period to the user.

8. The method of claim 7, wherein the multimedia data server transmits multimedia data to the user for the period, with no limit on the number of times, every time a request for download of multimedia data is received from the user.

9. A method for providing multimedia data at a multimedia data server, the method comprising the steps of:

maintaining a multimedia database including multimedia data;

maintaining a user database including available period information with respect to a right to download for each user, respectively, in which a right to download of the multimedia data is granted to the user for a period of time determined by the available period information;

receiving a request for download of predetermined multimedia data from the mobile communication terminal through a wireless communication network;

determining whether the download right has been granted to the user by referring to available period information associated with the user included in the user database;

searching the multimedia data by referring to the multimedia database, in case that the download right has been granted to the user;

generating authenticated multimedia data including the searched multimedia data and available period information associated with the user, in which the available period information is information about a playable period of the multimedia data; and transmitting the authenticated multimedia data to the mobile communication terminal through a wired/wireless communication network;

wherein the mobile communication terminal performs the steps of:

receiving the authenticated multimedia data from the multimedia data server, so as to store the same in a storage unit of the mobile communication terminal;

receiving a play command of the authenticated multimedia data from the user;

receiving current time information from a mobile switching center connected to the mobile communication terminal through the wireless communication terminal;

determining whether the play command is received within the playable period, which is determined by available period information included in the authenticated multimedia data, by using the current time determined using the current time information; and playing the authenticated multimedia data to provide the same to the user, in case that it is determined that the play command is received within the playable period.

10. A method for playing multimedia data in a mobile communication terminal, comprising the steps of:

receiving authenticated multimedia data from a predetermined multimedia data server, so as to store the same in a predetermined storage unit, • in which the authenticated multimedia data includes multimedia data and available period information associated with a user of the mobile communication network;

receiving a play command of the authenticated multimedia data from the user;

receiving current time information from a mobile switching center connected the mobile communication terminal through a wireless communication network;

determining whether the play command is received within the playable period which is determined by available period information included in the authenticated multimedia data, by using the current time determined using the current time information; and playing the authenticated multimedia data to provide the same to the user, in case that it is determined that the play command is received within the playable period.

11. A computer readable record medium recording a program for implementing the method according to claim 1.

* * * * *